(12) United States Patent
Caviglia et al.

(10) Patent No.: US 8,364,037 B2
(45) Date of Patent: Jan. 29, 2013

(54) ROUTING IN MULTILAYER OPTICAL NETWORKS

(75) Inventors: Diego Caviglia, Savona (IT); Giovanni Fiaschi, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 12/745,780

(22) PCT Filed: Jul. 8, 2008

(86) PCT No.: PCT/EP2008/058848
§ 371 (c)(1),
(2), (4) Date: Oct. 15, 2010

(87) PCT Pub. No.: WO2009/071346
PCT Pub. Date: Jun. 11, 2009

(65) Prior Publication Data
US 2011/0038628 A1 Feb. 17, 2011

(30) Foreign Application Priority Data

Dec. 3, 2007 (EP) .................................... 07122143

(51) Int. Cl.
*H04B 10/20* (2006.01)
(52) U.S. Cl. ......................................................... 398/58
(58) Field of Classification Search ........................ None
See application file for complete search history.

(56) References Cited

U.S. PATENT DOCUMENTS

| 7,224,897 B1 * | 5/2007 | Slezak et al. ..................... 398/5 |
| 2002/0131103 A1 * | 9/2002 | Bambos ........................ 359/118 |
| 2003/0035166 A1 * | 2/2003 | Zhang et al. ................... 359/118 |
| 2004/0246892 A1 * | 12/2004 | Elie-Dit-Cosaque et al. 370/216 |
| 2010/0017774 A1 * | 1/2010 | Bachina et al. ................. 716/16 |

FOREIGN PATENT DOCUMENTS

| EP | 1 303 110 | 4/2003 |
| EP | 1303110 A2 * | 4/2003 |

OTHER PUBLICATIONS

International Search Report for PCT/EP2008/058848, mailed Oct. 7, 2008.

\* cited by examiner

*Primary Examiner* — Kenneth N Vanderpuye
*Assistant Examiner* — Abbas H Alagheband
(74) *Attorney, Agent, or Firm* — Nixon & Vanderhye P.C.

(57) ABSTRACT

A method, system and network for routing a multiplexed signal through an optical network (1) comprising nodes (A to F) for routing signals along links (2 to 9) of the network (1), each node (A to F) comprising a lower order matrix (100) and/or a higher order matrix (110). Each matrix (110, 120) is capable of switching segments of the multiplexed signal between interfaces ($N_L5_H$) of the matrix (110,120), the lower order matrix (110) capable of switching smaller segments comprising fewer channels than the higher order matrix (120). The method comprises allocating a cost to using each interface ($N_L5_H$) of each matrix (110, 120), the allocated cost taking into account a relative value of the lower order matrix (110) to the higher order matrix (120) due to the capability of the lower order matrix (110) to switch smaller segments of the multiplexed signal, generating a cost function associated with possible routes for the signal through the network (1) from the allocated costs, and determining a route for the signal through the network (1) by optimizing the cost function. The system and network are arranged to carry out this method.

19 Claims, 4 Drawing Sheets

ROUTING IN MULTILAYER OPTICAL NETWORKS

This application is the U.S. national phase of International Application No. PCT/EP2008/058848, filed 8 Jul. 2008, which designated the U.S. and claims priority to EP Application No. 07122143.6, filed 3 Dec. 2007, the entire contents of each of which are hereby incorporated by reference.

TECHNICAL FIELD

This invention relates to routing in multilayer optical networks.

BACKGROUND

In optical networks, individual carrier signals (channels) are often multiplexed together to form a signal to be sent along optical links of the network. An example of such a technique is Wavelength Division Multiplexing (WDM), wherein different wavelengths of the multiplexed signal are used for each channel.

Networks comprise nodes (routers) for switching signals between optical links of the network. Many networks (referred to herein as multilayer optical networks) comprise switches (either nodes or parts of nodes) that operate on the multiplexed signal at different levels of granularity, with some switches able to divide the multiplexed signal into smaller segments (i.e. segments comprising fewer channels) than other switches of the network. For example, in a Synchronous Digital Hierarchy (SDH) network, the network is typically split into two layers, a high order layer comprising switches that operate at a granularity that is greater than one channel and a low order layer comprising switches that can operate on individual channels of the multiplexed signal. The high order layer is usually superior in cost effectiveness and scalability but the low order layer is more flexible in the allocation and grouping together of channels.

In such networks, routing algorithms are used to determine how to allocate network resources to satisfy traffic demands, the aim being to optimise the network resources such that as many demands as possible can be allocated. Accordingly, the routing algorithm for determining allocation of resources in the multilayer optical network will effect how efficiently the network operates. If the high order layer of the network is used too much, the bandwidth will be exhausted too fast as signals will utilise more bandwidth than would be the case if the signal was groomed of appropriate channels at more regular intervals. On the other hand, if the lower order layer is used too much, the grooming capacity of the lower order layer soon becomes unavailable.

SUMMARY

According to a first aspect of the invention there is provided a method of routing a multiplexed signal through an optical network, the network comprising nodes for routing signals along optical links of the network, each node comprising a lower order matrix and/or a higher order matrix, each matrix capable of switching segments of the multiplexed signal between interfaces of the matrix, the lower order matrix capable of switching smaller segments comprising fewer channels than the higher order matrix, the method comprising:

allocating a cost to using each interface of each matrix, the allocated cost taking into account a relative value of the lower order matrix to the higher order matrix due to the capability of the lower order matrix to switch smaller segments of the multiplexed signal, generating a cost function associated with possible routes through the network from the allocated costs, and determining a route for the signal through the network by optimising the cost function.

It is believed that by taking into account the relative value of the lower order matrix to the higher order matrix in terms of its capability to switch the smaller segments of the multiplexed signal, the method of the invention will determine more efficient routing solutions. In particular, the method will favour a route passing through a higher order matrix rather than a route passing through a lower order matrix when all other cost factors are substantially equal. It is preferable to maintain the lower order matrix free as the lower order matrix is more "precious" having additional switching capability compared to the higher order matrix.

It will be understood that the term "interface" as used herein is intended to mean a component of the matrix for connecting the matrix either directly or indirectly to an optical link of the optical network.

The cost of each interface may be determined with a formula, the formula for determining the cost of interfaces of both the higher order matrix and the lower order matrix comprising at least one common factor to determine a provisional cost, wherein a further factor is used to adjust the provisional cost to take into account the relative value of the lower order matrix to the higher order matrix.

In one embodiment, the provisional cost calculated for each interface of each lower order matrix may be increased to take into account the relative value of the lower order matrix to the higher order matrix in terms of its capability to switch the smaller segments of the multiplexed signal. Alternatively, the provisional cost calculated for each interface of each higher order matrix may be decreased to take into account the relative value of the lower order matrix to the higher order matrix in terms of its capability to switch the smaller segments of the multiplexed signal. In another embodiment, the provisional cost calculated for each interface of each lower order matrix and each higher order matrix may be increased and decreased respectively to take into account the relative value of the lower order matrix to the higher order matrix in terms of its capability to switch the smaller segments of the multiplexed signal.

The common formula may take into account the bandwidth of the interface and/or the administrative cost of a link to which the interface is connected.

The cost $c(Nh_i)$ of the ith interface of each high order matrix may be determined by:

$$c(Nh_i) = k \cdot a_i \cdot b(Nh_i),$$

and the cost $c(Nl_i)$ of the ith interface of each low order matrix may be determined by:

$$c(Nl_i) = k \cdot a_i \cdot b(Nl_i) \cdot M_j,$$

wherein k is a constant, ai is the administrative cost of a link connected to interface $Nh_i$ or $Nl_i$, $b(Nh_i)$ is the bandwidth of interface $Nh_i$, $b(Nl_i)$ is the bandwidth of interface $Nl_i$ and $M_j$ is a multiplying factor that adjusts the cost of the interface of the low order matrix to take into account the relative value of the lower order matrix to the higher order matrix in terms of its capability to switch the smaller segments of the multiplexed signal.

The cost for each interface of each lower order matrix may be determined by taking into account the relative switching capacities of the lower order matrix and the corresponding higher order matrix of the node. The cost for each interface of each lower order matrix may be determined by taking into account the relative switching capacity of the lower order matrices and the higher order matrices of the entire network.

The cost for each interface of the lower order matrix of a node j may be determined by using the multiplying factor:

$$M_j = f\left(\frac{cap(H_j)}{cap(L_j)}\right) \cdot g\left(\frac{\left(\sum_h cap(H_h)\right)}{\left(\sum_h cap(L_h)\right)}\right),$$

wherein $cap(H_j)$ is the switching capacity of the higher order matrix of node j, $cap(L_j)$ is the switching capacity of the lower order matrix of node j, $\sum_h cap(H_h)$ is the total switching capacity of the network, $\sum_h cap(L_h)$ is the total switching capacity of the lower order matrices of the network, $f(\ldots)$ is a function with the argument $$\frac{cap(H_j)}{cap(L_j)}$$

and $g(\ldots)$ is a function with the argument $$\frac{\left(\sum_h cap(H_h)\right)}{\left(\sum_h cap(L_h)\right)}.$$

In one embodiment, $f$ and/or $g$ are identity functions. In this way, the cost of using the interfaces of the low order matrices increases as the availability decreases (i.e. the less switching capacity there is available for the lower order matrices, the more "precious" the lower order matrices are).

Alternatively or additionally, the value of the lower order matrix relative to the higher order matrix may be determined another way, for instance by taking into account a ratio of a traffic demand for the lower order matrix to a traffic demand for the corresponding higher order matrix.

The method may comprise configuring a network comprising nodes for routing signals through the network, each node comprising a lower order matrix and a higher order matrix, each matrix capable of switching segments of the multiplexed signal between interfaces of the matrix, the lower order matrix capable of switching smaller segments comprising fewer channels than the higher order matrix, such that the nodes route a signal through the network in accordance with the determined route.

According to a second aspect of the invention there is provided a system for routing a multiplexed signal through an optical network, the network comprising nodes for routing signals through the network, each node comprising a lower order matrix and a higher order matrix, each matrix capable of switching segments of the multiplexed signal between interfaces of the matrix, the lower order matrix capable of switching smaller segments comprising fewer channels than the higher order matrix, the system arranged to carry out the method of the first aspect of the invention.

The system may be arranged to generate signals for controlling elements of the network to route traffic through the network in accordance with the determined route for the signal.

The system may be a router.

According to a third aspect of the invention there is provided a data carrier having stored thereon instructions that when executed by a processor of a system cause the system to operate in accordance with the system of the second aspect of the invention.

According to a fourth aspect of the invention there is provided a network comprising nodes for routing signals along communication links of the network, each node comprising a lower order matrix and a higher order matrix, each matrix capable of switching segments of the multiplexed signal between interfaces of the matrix, the interfaces connected to the communication links of the network, the lower order matrix capable of switching smaller segments comprising fewer channels than the higher order matrix, and a system arranged to determine a route for a signal through the network in accordance with the method of the second aspect of the invention and control the nodes in accordance with that determination.

The higher order matrices may comprise optical switches that can switch the signal in the photonic domain and the lower order matrices may comprise electronic switches that convert the signal between the photonic and electronic domain. Typically, optical switches have greater switching capacity but a higher granularity than the electronic switches that can provide finer grooming functions.

According to a fifth aspect of the invention there is provided a network comprising nodes for routing signals along optical links of the network, each node comprising a lower order matrix and a higher order matrix, each matrix capable of switching segments of the multiplexed signal between interfaces of the matrix, the interfaces connected to the communication links of the network, the lower order matrix capable of switching smaller segments comprising fewer channels than the higher order matrix, wherein the nodes are arranged to route a signal through the network in accordance with a route determined for the signal using the method according to the first aspect of the invention.

BRIEF DESCRIPTION OF THE DRAWINGS

Embodiments of the invention will now be described, by example only, with reference to the accompanying drawings, in which.

DETAILED DESCRIPTION

Figure 1:
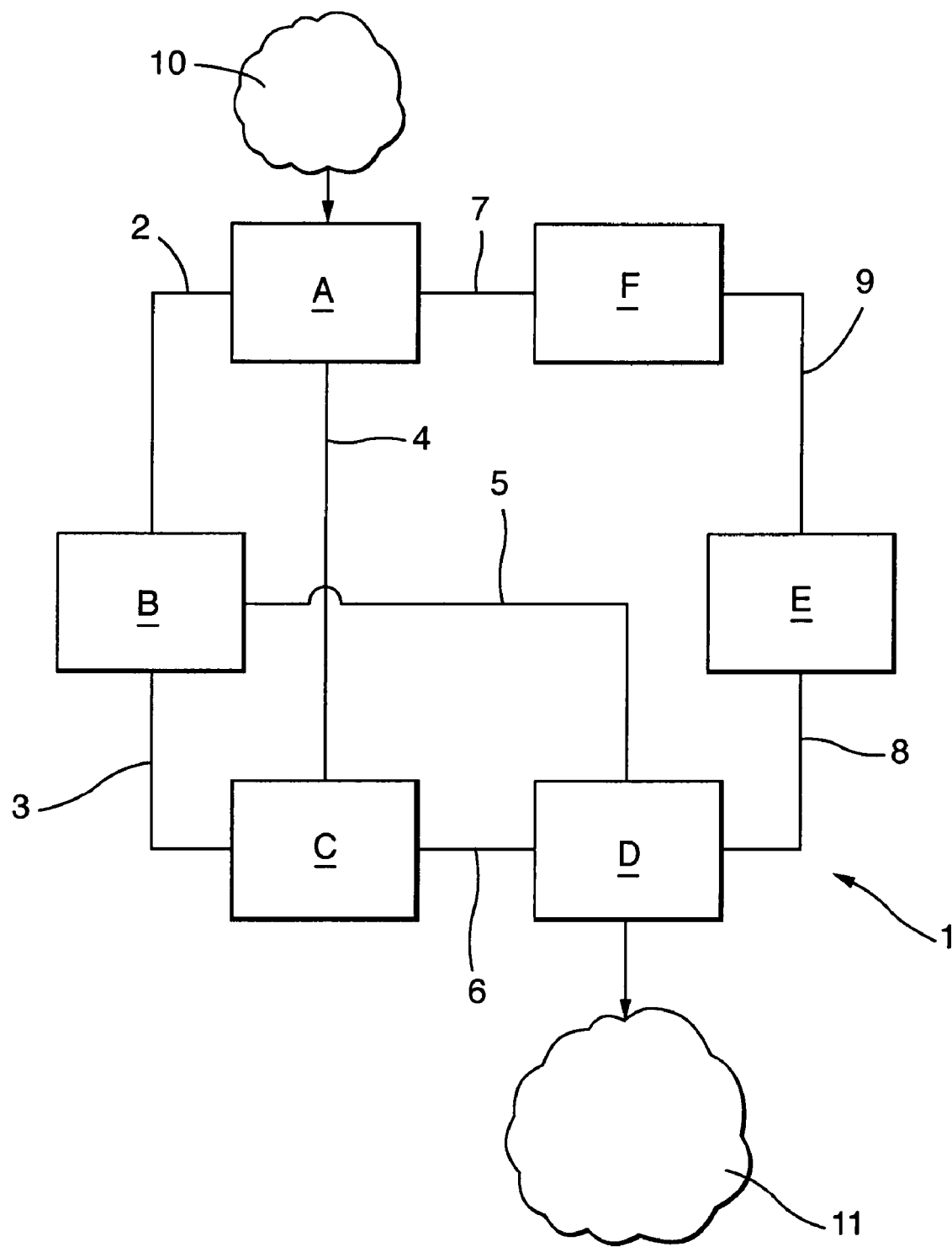
FIG. 1 is a schematic view of a network in accordance with the invention.

Referring to FIG. 1, an optical network 1 in accordance with the invention comprises a plurality of nodes (switches/routers) A to F connected together by a plurality of optical links 2 to 9. The nodes A to F are for routing a multiplexed signal, such as a WDM signal, through the optical network. In this embodiment, the network is illustrated as a mesh network, but it will be understood that the invention includes other network topologies, such as a star or ring network topology. In this embodiment, data can be input into node A from source 10 and output to destination 11 from node D. The other nodes may or may not also be connected to sources and/or destinations for data.

Figure 2:
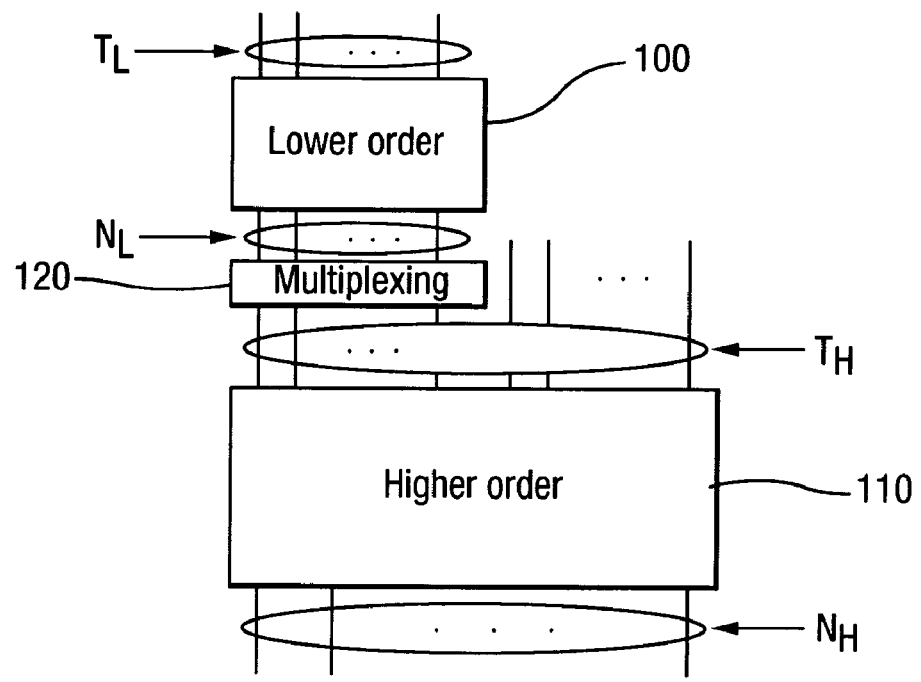
FIG. 2 is a schematic view of a node of the network in accordance with the invention.

Each node A to F (as shown in FIG. 2) comprises a lower order matrix 100 and/or a higher order matrix 110, each matrix 100,110 capable of switching segments of the multiplexed signal between interfaces $N_H$ and $N_L$ of the matrix 100,110. The network capacity of each matrix 100,110 (i.e. the capacity the matrix has to communicate with the network) is dependent on the number and capacity of interfaces N. The interfaces $N_H$ connect with peer matrices of other nodes A to F.

The lower order matrix 100 is capable of switching smaller segments comprising fewer channels than the higher order matrix 110. For example, in this embodiment, the lower order matrix 100 is arranged to switch individual channels of the multiplexed signal. In order to do this, the node comprises a multiplexing/demultiplexing module 120 between the higher order and lower order matrices 100, 110 that splits incoming multiplexed signals to the lower order matrix 100 into its individual channel components such that these channels can be fed into the lower order matrix 100 for switching and for combining the channels output from the lower order matrix 100 on interfaces $N_L$ into a multiplexed signal.

The outputs from module 120 are fed through the higher order matrix 110 to interfaces $N_H$. In this way, the lower order matrix 100 acts as a client to the higher order matrix 110 and requires the high order matrix 110 to have at least the same capacity as the lower order matrix 100. The node may also comprise connections (tributaries) $T_L$ and $T_H$ that connect the lower order matrix 100 and high order matrix 110 respectively to client entities, such as local area networks (LANS) (servicing streets or buildings) or stand-alone computers. Client entities that generate/receive non-multiplexed signals, send/receive signals to the network via the lower order matrix 100 comprising multiplexing module 120, whereas client entities that generate and receive appropriate multiplexed signals may send/receive signals directly to/from the network via the higher order matrix 110.

The tributary capacity of each matrix 100,110 (i.e. the capacity of the node to communicate with client entities) is dependent on the number and capacity of the tributary interfaces T. Accordingly, the total capacity of the lower order matrix 100 is IntCap($T_L$)+IntCap($N_L$), wherein IntCap($T_L$) is the total capacity of tributary interfaces $T_L$ and IntCap($N_L$) is the total capacity of network interfaces $N_L$. The total non-blocking capacity of the node is IntCap($T_H$)+IntCap($N_H$), wherein IntCap($N_H$) is the total capacity of tributary interfaces $T_H$ and IntCap($N_H$) is the total capacity of network interfaces $N_H$. The following relationships should also be true:
 1) IntCap($T_L$)≦IntCap($N_L$) and IntCap($T_H$)≦IntCap($N_H$) (i.e. it should be possible to send all traffic received on tributary interfaces to the network).
 2) IntCap($T_L$)≦IntCap($N_L$)≦IntCap($T_H$)≦IntCap($N_H$). (i.e. as the lower order matrix is client to the higher order matrix, it should be possible to send all traffic intended for the lower order matrix to the lower order matrix via the higher order matrix).

In one embodiment, the lower order matrix switches the signals in the electronic domain and the higher order matrix is an optical switch that switches signals in the photonic domain. Electronic switches tend to have less capacity than optical switches but provide finer grooming functions (i.e. are capable of switching smaller segments of multiplexed signals). Accordingly, a node comprising a combination of an electronic switch and an optical switch has a high capacity for switching multiplexed signals when fine grooming is not required but also is able to provide finer grooming of signals when this is required.

In a network, it may be possible for a signal to reach its intended destination via a number or routes. In FIG. 1, a signal can be sent from node A to node D via four possible routes (A-B-C-D, A-B-D, A-C-D, A-C-B-D). For each destination, each node may be pre-programmed with a specific route for the signal to take such that, on reading destination data in the signal, the node switches the signal along that pre-programmed route. Alternatively, each node may calculate the route each signal is to take on demand.

Whether the routes are pre-programmed or calculated on demand, a routing algorithm is required to determine the route. The routing algorithm should take into account the available network resources and the traffic demand and route the data traffic in order to make good use of the resources available. For a network comprising lower order and higher order matrices, a decision may also need to be made whether to use the higher order matrix and bypass the lower order matrix or to use the lower order matrix. Bypassing the lower order matrix saves fine grooming resources (which may be limited and therefore more precious than the higher order resources), whereas using the lower order matrix on that route allows the use of that lower order matrix for finer grooming of signals, if required.

Figure 3:
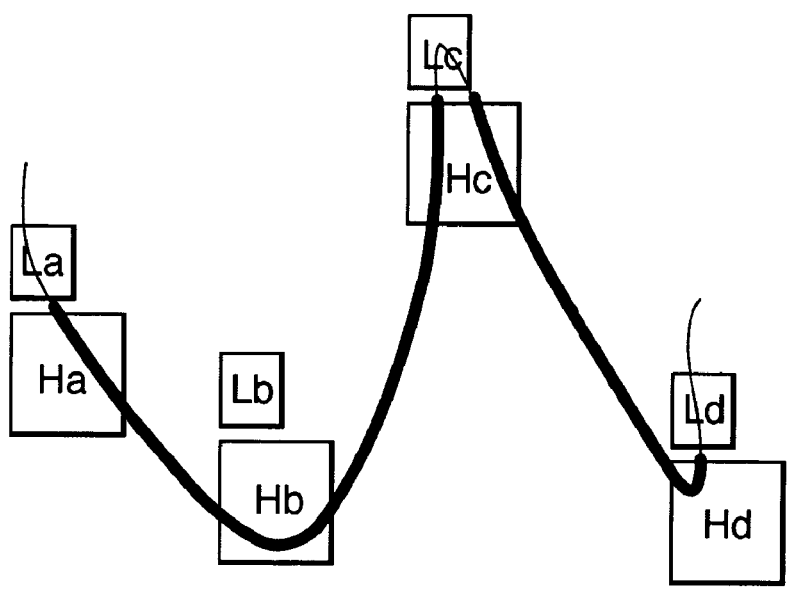
FIG. 3 is a schematic view of a route through nodes of a network.

An example of a route from node A to node D is shown in FIG. 3. In this example, the route comprises receiving non-multiplexed signals via the tributary interfaces of the lower order matrix of node A, multiplexing the signal (potentially with other signals) and sending the multiplexed signal to node B. At node B, the higher order matrix Hb directs the multiplexed signal to node C bypassing the lower order matrix of node B, whereas at node C, the signal is switched via the lower order matrix Lc. At node D the signal is demultiplexed and sent to the required client entities that are the destination for the signal via lower order matrix tributary interfaces. This route may be deemed the most appropriate route as signals may be sent from node A to node C and D. Therefore, signals for node D can be multiplexed together with signals for node C at node A, switched together at node B but demultiplexed at node C to extract the signals having node C as a destination whilst signals having node D as a destination are switched to pass on to node D.

Routing algorithms calculate appropriate routes by minimising a cost function used to calculate the cost of signals being sent along the possible routes. It will be understood that "cost" as referred to herein refers to a weighting that represents a penalty for using resources of the network and may be based on factors including an administrative cost, bandwidth, and capacity of the route, network resource, etc and the "preciousness" of the route, network resource, etc. Appropriate cost functions are known and methods of minimising these functions are known, however, the manner in which the cost associated with each resource is calculated will impact on the result of the minimisation of the cost function.

Typically, the endpoints of a route are considered to be the tributary interfaces and a routing algorithm does not take into account the cost of the endpoints (as the endpoints define the start and end of the route). Accordingly, the invention does not assign costs to the tributary interfaces of the nodes. Furthermore, the use of a network interface in the same node as the tributary interface cannot be avoided and therefore, this network interface is not associated with a cost. The invention aims to minimise the costs of the interfaces in transit nodes (i.e. intermediate nodes between the source and destination nodes).

In FIG. 3, the transit nodes are nodes B and C with node A being the source node and node D the destination node. In matrix Hb, there are two intermediate H network interfaces. In matrix Lc there are two intermediate L network interfaces. As matrix Lc is client to matrix Hc, matrix Hc has to provide paths from H network interfaces to the L network interfaces. These H network interfaces are considered not to contribute to the route cost. This is justified by the fact that, while a part of the capacity of the higher order matrix is used as a path to and from the lower order matrix, the remainder is still available for further services.

Figure 4:
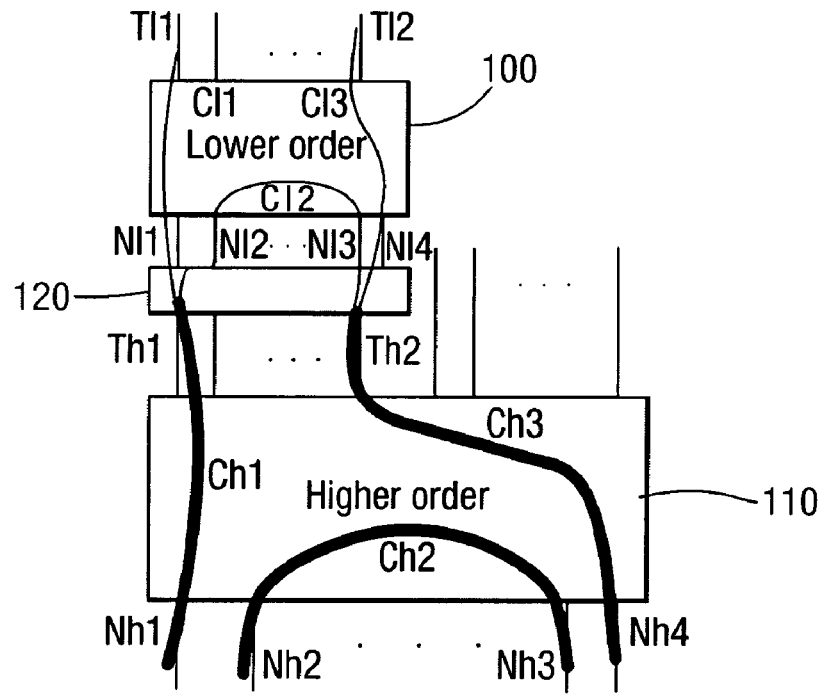
FIG. 4 is a schematic view of a node in use.

FIG. 4 illustrates a number of possible connections through a node. Incoming signals on tributary interfaces Tl1 and Tl2 of the lower order matrix 100 are connected via internal connections Cl1 and Cl3 to network interfaces Nl1 and Nl4 respectively. For this switch condition, Nl1 and Nl4 are attributed a cost of 0 as they are considered endpoint interfaces.

Lower matrix 100 also switches demultiplexed signals received from multiplexing module 120 between network interfaces Nl2 and Nl3 via connection Cl2. Connection Cl2 is a transit connection as it switches signals received from the optical network back into the optical network. Accordingly, these network interfaces are attributed a suitable cost, in the manner described below.

The signals on network interfaces Nl1 to Nl4 are then multiplexed by module 120 and connected to the higher order matrix 110 via interfaces Th1 and Th2 respectively. Interfaces Th1 and Th2 are connected via internal connections Ch1 and Ch2 in the higher order matrix 110 to network interfaces Nh1 and Nh4.

Network interfaces Nl1 and Nl4 are attributed a cost of 0 as the interfaces act both as endpoint interfaces for the signals sent to Tl1 and Tl2 and a path to the lower order matrix 100 for connection Cl2. In neither of these cases is a cost allocated to the network interfaces Nh1 and Nh4.

Higher order matrix 110 also switches multiplexed signals received from network interfaces Nh2 and Nh3 via connection Ch2. Connection Ch2 is a transit connection as it switches signals received from a link of the optical network back to another link of the optical network. Accordingly, network interfaces Nh2 and Nh3 are attributed a suitable cost, in the manner described below.

The cost of a transit network interface (in FIG. 4, Nl2, Nl3, Nh2 and Nh3) will be proportional to its capacity as the utilisation of a higher capacity interface will reduce the potential of the node/network to cope with further traffic than utilisation of a lower capacity interface. This is true for both the lower order matrix and the higher order matrix.

An administrative cost for the link connected directly or indirectly (via multiplexing module 120) to the interface may also be attributed to the interface. Each link is usually associated with an administrative cost to allow the operator to configure routing preferences. In the invention, the administrative costs of the links are projected onto the cost of the associated interfaces.

If these are the only factors that are considered as contributing to the cost then it is possible that the routing algorithm will fail to take into account that the lower order matrix 100 may be more "precious" than the higher order matrix 110 as it is able to carry out finer grooming of the multiplexed signal.

Figure 5:
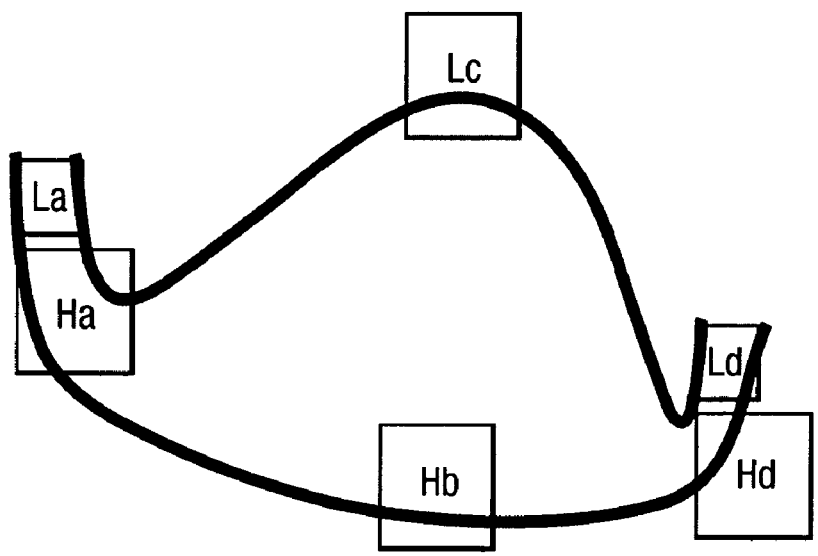
FIG. 5 is a schematic view of possible alternative routes through nodes of a network.

In FIG. 5, two possible routes are shown from a node A to a node D. One of the routes utilises the lower order matrix of node C, whereas the other route utilises the higher order matrix of node B. If the capacity of the two matrices is equal and the administrative cost of the links is equal, then by using the factors described above the routing algorithm would calculate the cost of either route as being the same and favour neither. However, the value of the lower order matrix relative to the higher order matrix is greater as it is capable of switching smaller segments of the multiplexed signal than the higher order matrix. In particular, there may be a future demand for grooming to be performed by matrix Lc. If the route via matrix Hb is favoured for equal capacity and administrative cost over the route via Lc, matrix Lc would be kept free, whereas with no weighting for the "preciousness" of matrix Lc built into the cost, there is a chance that the routing algorithm will utilise Lc when it is advantageous to keep this node free.

Therefore, in this embodiment of the invention, the cost of a network interface of a lower order matrix will be increased by a factor depending on the relative capacity in the whole optical network of the higher order and lower order matrices.

The costs assigned to each transit network interface for a node j may be calculated as follows:

The cost $c(Nh_i)$ of the ith interface of each high order matrix may be determined by:

$$c(Nh_i)=k \cdot ai \cdot b(Nh_i),$$

and the cost $c(Nl_i)$ of the ith interface of each low order matrix may be determined by:

$$c(Nl_i)=k \cdot ai \cdot b(Nl_i) \cdot M_j,$$

wherein k is a constant, ai is the administrative cost of a link connected to interface $Nh_i$ or $Nl_i$, $b(Nh_i)$ is the bandwidth of interface $Nh_i$, $b(Nl_i)$ is the bandwidth of $Nl_i$ and $M_j$ is a multiplying factor that adjusts to cost of the interface of the low order matrix to take into account the relative value of the lower order matrix to the higher order matrix in terms of its capability to switch the smaller segments of the multiplexed signal.

The multiplying factor may be determined by:

$$M_j = \frac{cap(H_j)}{cap(L_j)} \cdot \frac{\left(\sum_h cap(H_h)\right)}{\left(\sum_h cap(L_h)\right)},$$

wherein $cap(H_j)$ is the switching capacity of the higher order matrix of node $j_j$, $cap(L_j)$ is the switching capacity of the lower order matrix of node j, $\Sigma_h cap(H_h)$ is the total switching capacity of the network and $\Sigma_h cap(L_h)$ is the total switching capacity of the lower order matrices of the network. In this way, the cost of using the interfaces of the low order matrices increases as the availability decreases (i.e. the less switching capacity there is available for the lower order matrices, the more "precious" the lower order matrices are).

Once costs have been assigned to the interfaces, these can be inserted into the cost function and the cost function minimised to determine the route for specified endpoints that has the minimum cost.

Figure 6:
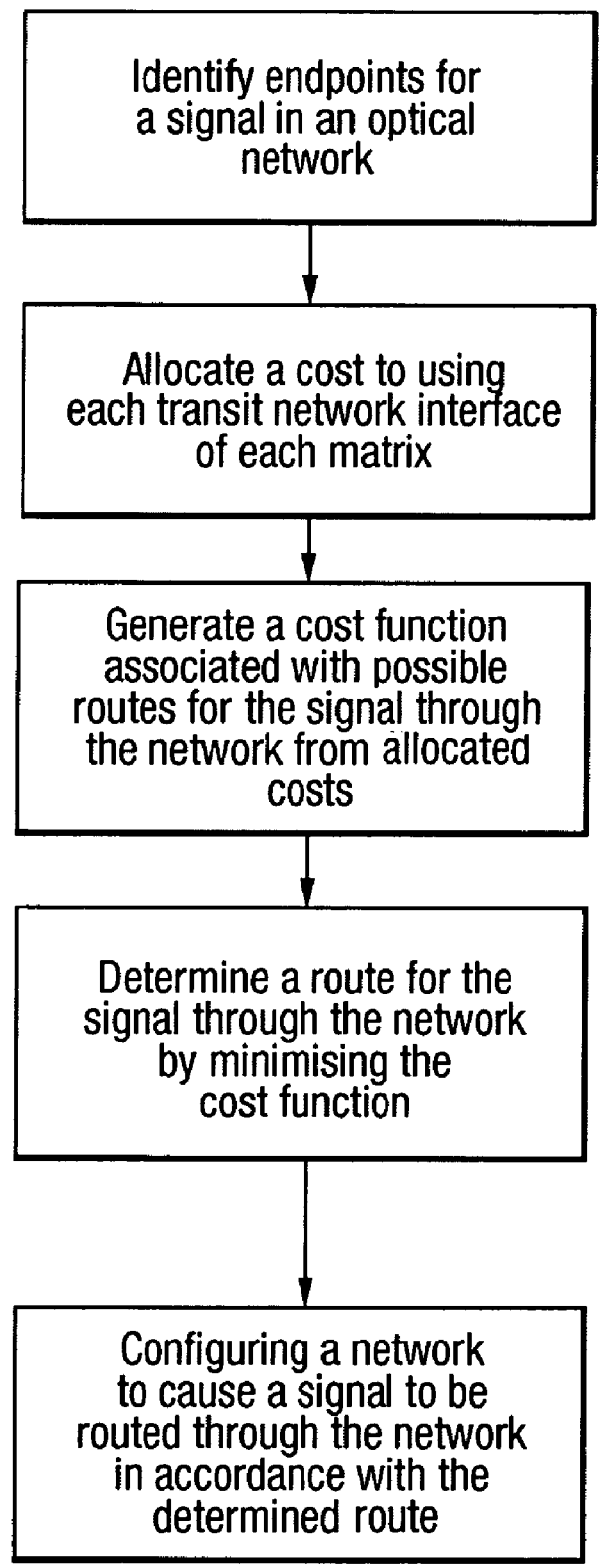
FIG. 6 is a flow diagram illustrating the method of one embodiment of the invention.

A network may then be configured with the determined routes by programming the nodes A to F, etc. A summary of the described method is illustrated in FIG. 6.

Methods in accordance with the invention are advantageous as they are more likely to determine a more efficient routing solution through the network as the manner in which costs are attributed increases the likelihood that lower order switching capacity will be kept free for grooming of network signals.

The method of the invention can be implemented in software, in a router and/or a system for managing the network that is arranged to programme routers of an optical network with the determined route.

The invention claimed is:

1. A method of routing a multiplexed signal through an optical network, the network comprising nodes for routing signals along links of the network, each node comprising a lower order matrix and/or a higher order matrix, each matrix capable of switching segments of the multiplexed signal between interfaces of the matrix, the lower order matrix capable of switching smaller segments comprising fewer channels than the higher order matrix, the method comprising:

allocating a cost to using each interface of each matrix, the allocated cost taking into account a relative value of the lower order matrix to the higher order matrix due to the capability of the lower order matrix to switch smaller segments of the multiplexed signal, generating a cost function associated with possible routes for the signal through the network from the allocated costs, and determining a route for the signal through the network by optimising the cost function.

2. A method according to claim 1, wherein the cost of each interface is determined with a formula, the formula for determining the cost of interfaces of both the higher order matrix and the lower order matrix comprising at least one common factor to determine a provisional cost, wherein a further factor is used to adjust the provisional cost to take into account the relative value of the lower order matrix to the higher order matrix.

3. A method according to claim 2, wherein the provisional cost calculated for each interface of each lower order matrix is increased to take into account the relative value of the lower order matrix to the higher order matrix.

4. A method according to claim 2, wherein the provisional cost calculated for each interface of each higher order matrix is decreased to take into account the relative value of the lower order matrix to the higher order matrix.

5. A method according to claim 2, wherein the provisional cost calculated for each interface of each lower order matrix and each higher order matrix is increased and decreased respectively to take into account the relative value of the lower order matrix to the higher order matrix.

6. A method according to claim 2, wherein the common factors take into account the bandwidth of the interface and/or the administrative cost of a link to which the interface is connected.

7. A method according to claim 1, wherein the cost $c(Nh_i)$ of the ith interface of each high order matrix is determined by:

$$c(Nh_i) = k \cdot ai \cdot b(Nh_i),$$

and the cost $c(Nl_i)$ of the ith interface of each low order matrix may be determined by:

$$c(Nl_i) = k \cdot ai \cdot b(Nl_i) \cdot M_j,$$

wherein k is a constant, ai is the administrative cost of a link connected to interface $Nh_i$ or $Nl_i$, $b(Nh_i)$ is the bandwidth of interface $Nh_i$, $b(Nl_i)$ is the bandwidth of interface $Nl_i$ and $M_j$ is a multiplying factor that adjusts to cost of the interface of the low order matrix to take into account the relative value of the lower order matrix to the higher order matrix.

8. A method according to claim 7, wherein the cost for each interface of the lower order matrix of a node j is determined by using the multiplying factor:

$$M_j = f\left(\frac{cap(H_j)}{cap(L_j)}\right) \cdot g\left(\frac{\left(\sum_h cap(H_h)\right)}{\left(\sum_h cap(L_h)\right)}\right)$$

wherein $cap(H_j)$ is the switching capacity of the higher order matrix of node j, $cap(L_j)$ is the switching capacity of the lower order matrix of node j, $\Sigma_h cap(H_h)$ is the total switching capacity of the network, $\Sigma_h cap(L_h)$ is the total switching capacity of the lower order matrices of the network, $f(\ldots)$ is a function with the argument $$\frac{cap(H_j)}{cap(L_j)}$$

and $g(\ldots)$ is a function with the argument $$\frac{\left(\sum_h cap(H_h)\right)}{\left(\sum_h cap(L_h)\right)}.$$

9. A method according to claim 8, wherein f and/or g are identity functions.

10. A method according to claim 9, wherein:

$$M_j = \frac{cap(H_j)}{cap(L_j)} \cdot \frac{\left(\sum_h cap(H_h)\right)}{\left(\sum_h cap(L_h)\right)}.$$

11. A method according to claim 7, wherein the value of the lower order matrix relative to the higher order matrix is determined by taking into account a ratio of a traffic demand for the lower order matrix to a traffic demand for the corresponding higher order matrix.

12. A method according to claim 1 comprising configuring a network comprising nodes for routing signals through the network, each node comprising a lower order matrix and a higher order matrix, each matrix capable of switching segments of the multiplexed signal between interfaces of the matrix, the lower order matrix capable of switching smaller segments comprising fewer channels than the higher order matrix, such that the nodes route a signal through the network in accordance with the determined route.

13. A system for routing a multiplexed signal through an optical network, the network comprising nodes for routing signals through the network, each node comprising a lower order matrix and a higher order matrix, each matrix capable of switching segments of the multiplexed signal between interfaces of the matrix, the lower order matrix capable of switching smaller segments comprising fewer channels than the higher order matrix, the system arranged to carry out the method of claim 1.

14. A system according to claim 13, arranged to generate signals for controlling elements of the network to route traffic through the network in accordance with the determined route for the signal.

15. A system according to claim 13, wherein the system is a router.

16. A data carrier having stored thereon instructions that when executed by a processor of a system causes the system to operate in accordance with the system of claim 13.

17. A network comprising nodes for routing signals along optical links of the network, each node comprising a lower order matrix and a higher order matrix, each matrix capable of switching segments of the multiplexed signal between interfaces of the matrix, the interfaces connected to the communication links of the network, the lower order matrix capable of switching smaller segments comprising fewer channels than the higher order matrix, and a system arranged to determine a route for a signal through the network in accordance with the method of claim 1 and control the nodes in accordance with that determination.

18. A network according to claim 17, wherein the higher order matrices comprise optical switches that can switch the signal in the photonic domain and the lower order matrices comprise electronic switches that convert the signal between the photonic and electronic domain.

19. A network comprising nodes for routing signals along optical links of the network, each node comprising a lower order matrix and a higher order matrix, each matrix capable of switching segments of the multiplexed signal between interfaces of the matrix, the interfaces connected to the communication links of the network, the lower order matrix capable of switching smaller segments comprising fewer channels than the higher order matrix, wherein the nodes are arranged to route a signal through the network in accordance with a route determined for the signal using the method according to claim 1.

* * * * *

UNITED STATES PATENT AND TRADEMARK OFFICE
CERTIFICATE OF CORRECTION

PATENT NO. : 8,364,037 B2
APPLICATION NO. : 12/745780
DATED : January 29, 2013
INVENTOR(S) : Caviglia et al.

Page 1 of 1

It is certified that error appears in the above-identified patent and that said Letters Patent is hereby corrected as shown below:

In the Specifications:

In Column 5, Line 32, delete "(LANS)" and insert -- (LANs) --, therefor.

In the Claims;

In Column 9, Line 60, in Claim 7, delete "Nh$_i$or" and insert -- Nh$_i$ or --, therefor.

In Column 10, Line 28, in Claim 9, delete "wherein/and/or" and insert -- wherein $f$ and/or --, therefor.

Signed and Sealed this
Sixteenth Day of July, 2013

Teresa Stanek Rea
*Acting Director of the United States Patent and Trademark Office*